US010891382B2

(12) United States Patent
Bryant et al.

(10) Patent No.: US 10,891,382 B2
(45) Date of Patent: Jan. 12, 2021

(54) CYBERSECURITY BY I/O INFERRED FROM EXECUTION TRACES

(71) Applicant: Raytheon Company, Waltham, MA (US)

(72) Inventors: Timothy K. Bryant, Indialantic, FL (US); Andrew R. Calvano, Draper, UT (US)

(73) Assignee: Raytheon Company, Waltham, MA (US)

( * ) Notice: Subject to any disclaimer, the term of this patent is extended or adjusted under 35 U.S.C. 154(b) by 266 days.

(21) Appl. No.: 15/971,637

(22) Filed: May 4, 2018

(65) Prior Publication Data
US 2019/0340366 A1  Nov. 7, 2019

(51) Int. Cl.
*H04L 29/06* (2006.01)
*G06F 21/57* (2013.01)
*G06F 12/14* (2006.01)
*G06F 21/54* (2013.01)

(52) U.S. Cl.
CPC .......... *G06F 21/577* (2013.01); *G06F 12/145* (2013.01); *G06F 21/54* (2013.01); *G06F 2212/1052* (2013.01); *G06F 2221/034* (2013.01)

(58) Field of Classification Search
CPC .... G06F 11/3466; G06F 21/54; G06F 21/566; G06F 2212/1052; G06F 11/3636; G06F 12/145; G06F 21/577; G06F 2221/033; G06F 2221/034
See application file for complete search history.

(56) References Cited

U.S. PATENT DOCUMENTS

| | | | |
|---|---|---|---|
| 9,904,485 B2* | 2/2018 | Gopal | G06F 12/0897 |
| 9,959,194 B1* | 5/2018 | Mola | G06F 11/3636 |
| 2012/0254839 A1 | 10/2012 | Fink et al. | |
| 2015/0331738 A1 | 11/2015 | Burghard et al. | |

FOREIGN PATENT DOCUMENTS

WO   WO-2019213357 A1   11/2019

OTHER PUBLICATIONS

"International Application Serial No. PCT US2019 030336, International Search Report dated Jun. 19, 2019", 5 pgs.
"International Application Serial No. PCT US2019 030336, Written Opinion dated Jun. 19, 2019", 7 pgs.

* cited by examiner

*Primary Examiner* — Tri M Tran
(74) *Attorney, Agent, or Firm* — Schwegman Lundberg & Woessner, P.A.

(57) ABSTRACT

A method can include for vulnerability analysis based on input or output points inferred from execution traces can include monitoring application access operations to a memory, monitoring responses from the memory to the access operations, generating execution traces based on the monitored access operations and responses, the execution traces including data identifying an instruction to be performed and a corresponding memory location to access in performing the operation, identifying and recording whether the instruction corresponds to an input or an output to the system based on the generated execution traces, and determining vulnerabilities of the application based on the generated execution traces and identification of the instruction corresponding to the input or output.

16 Claims, 3 Drawing Sheets

CYBERSECURITY BY I/O INFERRED FROM EXECUTION TRACES

TECHNICAL FIELD

Embodiments discussed herein regard devices, systems, and methods for cyber vulnerability analysis.

BACKGROUND

Malware, short for malicious software, is one of a variety of techniques used to control a device or application without administrator knowledge. Other adverse actions that fall within a cybersecurity domain include manual control of the device or application (e.g., direct injection), scrambling, intercepting (e.g., eavesdropping), spoofing, denial of service, or the like. Each of these types of adverse actions can be detrimental to operation of a device or an application. To help understand which cybersecurity measures to implement in combating possible adverse actions to the device or application, it can be advantageous to know the input and output points or the device or application.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Figure 1:
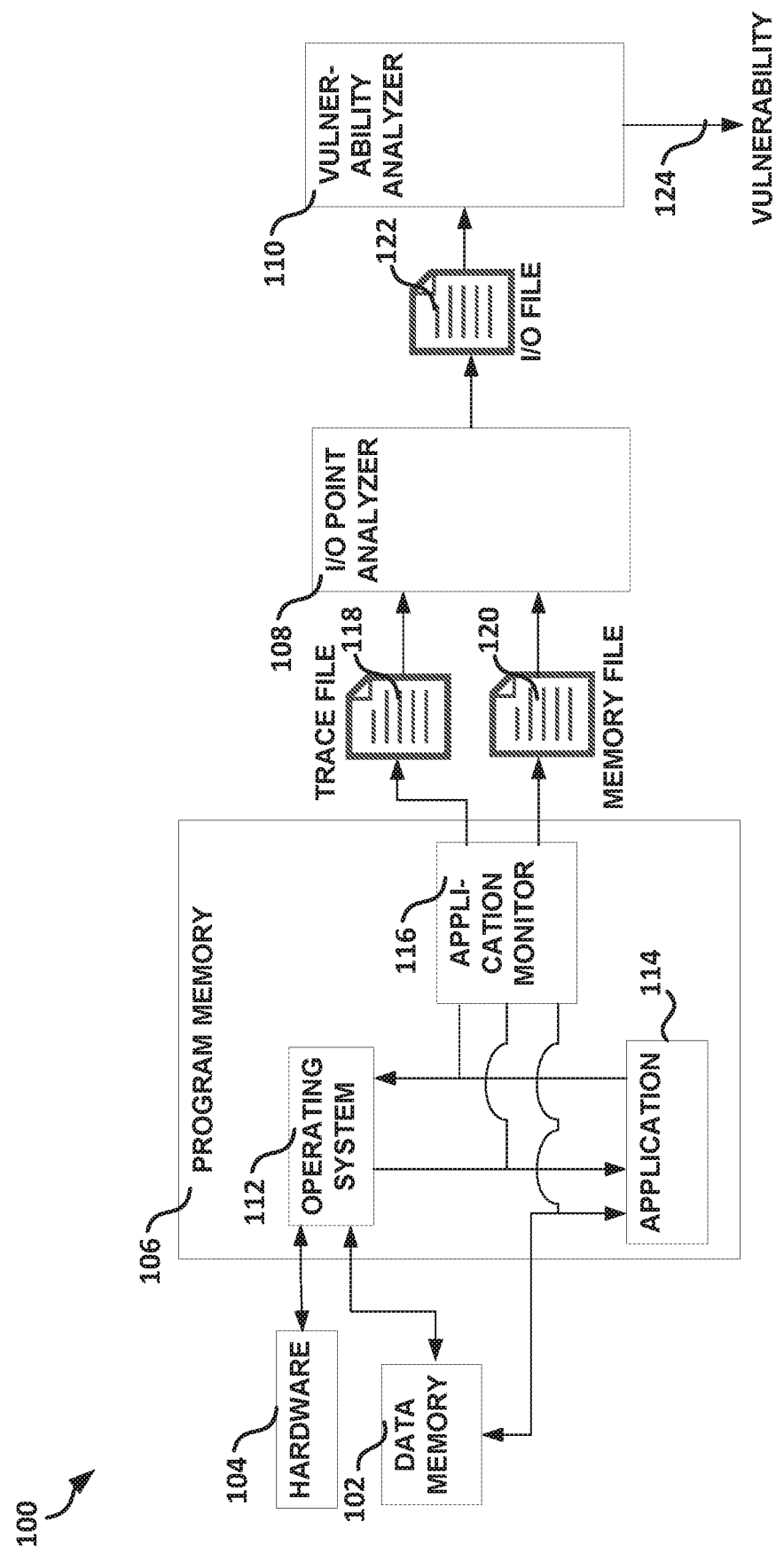
FIG. 1 illustrates, by way of example, an embodiment of a system 100 for input/output (I/O) identification and vulnerability analysis.

Embodiments generally relate to determining input and output points for data in a device or application. The input and output points can be used to help determine cybersecurity measures to be used to help protect the device or application. Further, data provided on the input or output points can be classified as pointer, random data, or the like.

An essential and recurring challenge when analyzing a binary or other software for vulnerabilities is modelling the execution environment in which the software is executed. It can be beneficial for the vulnerability researcher to know where attacker data is input into the system, or where sensitive data is output from the system. For well-known platforms, these input/output (I/O) points are known. This is even if there are many I/O points. However, when presented with a wide-range of devices, applications, or platforms on which the devices or applications rely (e.g., Internet of Things (IoT) devices) each device, application, or platform can be separately and manually identified and researched.

Current vulnerability analysis software receives, as input, I/O point data. The I/O point data indicates where data enters or exits the system and which input channels can be controlled by a potential attacker. The vulnerability analysis software then identifies vulnerabilities based on this input.

Embodiments herein eliminate a need to manually research a platform, device, or application to determine I/O points. Embodiments can automatically infer I/O points by creating and analyzing recorded execution traces. Embodiments can reduce an amount of time it takes to analyze a new platform. Embodiment can be more accurate than manual methods of determining I/O points, such as to identify more I/O points and be faster than a manual method of determining I/O points. Embodiments can enable fully-automated methods for analyzing new platforms, devices, or applications for I/O points or vulnerabilities without manual intervention.

Using current methods and as previously discussed, human experts provide a vulnerability assessment tool with a list of I/O functions or points (or the lists are supplied by the author of the tools for well-known platforms). When a new platform is encountered, relevant functions and points are manually identified and added to a list. When functions are not properly identified as I/O functions, the assessment tools will not test or find the related vulnerabilities. For embedded devices, the direct memory access (DMA) regions in memory are generally manually identified. Shared memory communication channels are usually ignored. Using the current tools, if the assessment tool can use data types, each of the different types of I/O, if present, are manually classified.

An I/O point identification of embodiments can perform one or more functions: 1) identify where data enters and exits the system (e.g., in terms of instruction execution, memory address, function being performed, or pin); and 2) classify the type of data entering or exiting at the I/O point in operation.

Embodiments can use dynamic or static analysis on recorded execution traces or memory traces. Although embodiments can be especially useful to create and analyze software binaries without source code, embodiments can be applied to any software than can be executed and where execution traces or memory traces have been recorded.

As previously discussed, embodiments can create and use execution traces and memory traces that capture instruction data and memory address and values at each instruction. With this information, embodiments can detect discrepancies between what an application has written to memory versus what the program later reads from memory. If a value stored in memory has changed, it can be inferred that an external actor (e.g., through the kernel, DMA, etc.) has modified that memory value. Thus, it can be inferred that memory location is used to communicate between the program and an external actor, and the program instruction where the discrepancy occurs is an I/O point. A weaker inference can be made for transmitted values that are not later used by the application. That is, when a value is written to memory and the program never uses that value but it is subsequently overwritten, it can be inferred that the memory is potentially used to transmit data to an external actor. Note that there may be one or more external actors.

Embodiments can assume that each instruction at which a discrepancy is detected corresponds to a unique external actor (or channel). By examining the values and the way the values are accessed by the application or external actor, a data type can be inferred. In particular, embodiments can detect whether or not the values are likely pointers returned by the operating system (e.g., kernel) when allocating memory, or other type of value.

Embodiments can inspect the entropy of the values to determine if the channel might correspond to a random value (e.g., /dev/random). After the I/O inferences have been made, the execution traces can be augmented with I/O points and data type information, which can allow for various vulnerability assessments.

In summary, embodiments can use execution traces (e.g., an instruction operand, instruction type, memory usage pattern, and memory value, or the like) to infer where an application or device communicates with its environment (e.g., where data enters and exits the application). Embodiments can distinguish between data types, which helps enable vulnerability assessment. Embodiments can provide vulnerability analysis of a binary without human reverse engineering to identify I/O points as was done previously.

Reference will now be made to the FIGS. to describe further details of embodiments.

FIG. 1 illustrates, by way of example, a diagram of an embodiment of a system 100 for creating and analyzing execution traces. The system 100 as illustrated includes a data memory 102, hardware 104, program memory 106, I/O point analyzer 108, and a vulnerability analyzer 110.

The data memory 102, sometimes called random access memory (RAM), is used for storing results, intermediate results, and variables of execution of an application 114 or application monitor 116. Types of RAM include static RAM (SRAM), dynamic RAM (DRAM), synchronous dynamic RAM (SDRAM), single data rate SDRAM (SDR SDRAM), double data rate (DDR RAM), DDR SDRAM, graphics DDR SDRAM (GDDR), flash, or the like. Data memory 102 can have a variety of interfaces (e.g., ways in which the data memory 102 physically connects with other components) sizes (e.g., capacities, such as can be measured in bits, bytes, words, or the like), and speeds (e.g., measured in frequency, such as Megahertz, Gigahertz or the like).

The hardware 104 includes the components that physically implement operations of the system 100. The hardware 104 can include a central processing unit (CPU), arithmetic logic unit (ALU), a port (e.g., an I/O connection to a peripheral device), or other processing circuitry. The processing circuitry can include a hardware processor, such as a CPU, a graphics processing unit (GPU), an application specific integrated circuit, circuitry, such as one or more transistors, resistors, capacitors, inductors, diodes, logic gates, multiplexers, oscillators, buffers, modulators, regulators, amplifiers, demodulators, or radios (e.g., transmit circuitry or receive circuitry or transceiver circuitry, such as RF or other electromagnetic, optical, audio, non-audible acoustic, or the like), sensors 1021 (e.g., a transducer that converts one form of energy (e.g., light, heat, electrical, mechanical, or other energy) to another form of energy), or the like, or a combination thereof.

The program memory 106, sometimes called read only memory (ROM), is for storing instructions of a program being executed. Types of ROM include erasable program memory, non-erasable program memory, electrically erasable program memory, electrically alterable memory, flash, NAND flash, or the like. Program memory 106 can have a variety of interfaces (e.g., ways in which the program memory 106 physically connects with other components) sizes (e.g., capacities, such as can be measured in bits, bytes, words, or the like), and speeds (e.g., measured in frequency, such as Megahertz, Gigahertz or the like). The program memory 106 stores code and is split into a boot section and an application section. Sometimes, program memory 106 is used to store constant variables. The application section stores application code. The application code can include code for the operating system 112, application 114, and application monitor 116. The boot section stores the basic I/O system (BIOS) code.

The operating system 112 provides an interface between the software (e.g., application 114, application monitor 116, or other) and the hardware 104. The application 114 can request memory allocation of memory space in the data memory 102 from the operating system 112. Common operating systems include the Windows from Microsoft Corporation of Redmond, Wash., United States, macOS from Apple, Inc. of Cupertino, Calif., United States, Linux which is open source and communally developed, Android from Google, LLC of Menlo Park, Calif., United States, and iOS also from Apple Inc.

The application 114 is any computer program installed on a device, such as a desktop computer, laptop computer, tablet, mobile phone, phablet, vehicle (e.g., car, plane, boat, truck, drone or other autonomous vehicle, or the like), an Internet of Things (IoT) device, an embedded device, or the like. An IoT device is an internet or other network capable device that can communicate to another device through the network. An IoT device can control or sense an object remotely across an existing network infrastructure.

Embedded, IoT, and other devices can have custom applications loaded or executing thereon. The cybersecurity status of these custom applications is more suspect than standard, well-known applications, because the I/O points are generally not well known. To provide cybersecurity on these devices, many entities will create robust firewalls and other access restrictions external to the device that reduce a likelihood that an external actor will gain control of the device. However, these cybersecurity measures can be more than is needed and consume valuable resources. To more intelligently design and implement more pointed, effective, less resource intensive cybersecurity measures, it can be beneficial to determine I/O points of an application (e.g., the operating system 112 or the application 114) operating on the device.

To help facilitate identification of the I/O points of the application 114, an application monitor 116 records data of the access operations from the application 114 and data of responses from the data memory 102. The access operations are for reading/writing data from/to the data memory 102 or operation(s) to be performed by the hardware 104. The responses are the results of the access operations, such as can include an acknowledge, a negative acknowledge, a value, an address associated with the value, or the like.

The application monitor 116 can record a program counter, an instruction pointer, a thread identifier (in an embodiment in which the application 114 includes multiple threads), whether there are any "if" conditions satisfied and executing, an instruction size, a number of memory operands in the instruction, and a data field. These data can be included in an execution trace in a trace file 118. What follows is an example of a structure of an execution trace:

```
Struct ExecutionTrace {
ctr; //index indicating number of instructions that have executed
ip; //instruction pointer
thread_id; //identifier of thread
flags; //identify whether conditional execution is satisfied and being
executed
instrctn_size; //number of bytes in instruction
memop_cnt; //number of memory operands in instruction
data[ ]; //variable length field sized based on instrctn_size and
        //memop_cnt and stores the bytes of the instruction that executed
        //and the memory addresses read or written. For example, if
```

-continued

```
//instrctn_size is three, memop_cnt is two, and a memory size
//is 8, data[ ]is 19 bytes (3 + 8*2)
}
```

The application monitor 116 can identify memory data and generate a memory file 120 based on the memory data. The memory data includes values read or written from memory instead of just the memory addresses included in the execution trace (as in the trace file 118). The memory entry can include one or more values read or written from memory. The memory entry can include a program counter entry and a read/write entry. A program counter entry can include a counter and an instruction pointer. The read/write entry can include a memory address, a length, and a value. What follows is an example of a structure of a memory entry:

```
struct MemoryEntry {
enum Type : uint8_t {
ENTRYTYPE_CTR = 1, //program counter and location
ENTRYTYPE_READ = 2, //distinguish between read and write operation
in
        //memory includes address, size, and values
ENTRYTYPE_WRITE =3 //write of four bytes includes one program
counter entry
        //followed by one write entry, length will be 4 and the value will
        //correspond to values at that location //} type;
union {
struct { //CTR entry
ctr; //index indicating number of instructions that have executed
ip; //instruction pointer
};
struct { //READ/WRITE Entry
addr; //address
len; //length
value[ ]; //array of memory values beginning at address with number of
values equal
        //to length
};
__attribute__((packed)) memop;
}
}
```

The I/O point analyzer 108 receives the trace file 118 and the memory file 120 and produces a list of possible input and output points of the application 114. An input or output point can include an instruction counter, an instruction pointer, a type identifier, input/output, or the like. The instruction counter and instruction pointer can be directly from the trace file 118 or the memory file 120. The type identifier can indicate whether the I/O from the application is a pointer, random data, untrusted, or other.

Whether the I/O point is a pointer, random data, untrusted, or other, can be determined based on a nature of the application 114 interaction with the data memory 102. An I/O point can be determined to be a pointer, if, in response to a access operation from the application 114, the data memory 102 returns a value that (a) has a size that is a multiple of a memory address size used to address the data memory 102 and (b) is page aligned (includes a value that is a multiple of a number of memory entries on a memory page of the data memory 102). Additionally, or alternatively, if a value returned by the operating system 112 or the data memory 102 is subsequently used as an address of memory in a memory access (e.g., in a read or write operation), that value can be labelled as a pointer by the I/O point analyzer 108.

An I/O point can be determined to be random data using an entropy calculation of a series of data values of the same I/O point. Totally random data tends to take on any possible integer value with a uniform distribution of all possible data values. If the data tends towards this entropy value (e.g., greater than 7.8 bits per byte of entropy), based on a uniform distribution assumption of choosing, then the data be assumed to be random data. If the I/O point is determined to not be a pointer, or random, it can be treated as a general, other, or untrusted I/O point.

Whether the I/O point is an input or output can be inferred based on detected application or external actor interaction with the data memory 102. If the application 114 writes data to the data memory 102 and the memory value is later overwritten by the application, the I/O point can be considered an output point. If the application 114 writes data to the data memory 102 and the memory value is not used by the application, the I/O point can be considered an output point. A memory value that has changed to a value that was not initiated by the application 114 and is subsequently accessed by the application 114 can be considered an input point.

The I/O point analyzer 108 can produce an I/O file 122 with data indicating I/O program counters, instruction pointers, indication of whether the point is an input or output, and whether the point operated on a pointer, random data, other data, or the like. Data of the I/O file 122 can be input to the vulnerability analyzer 110. The I/O file 122 can be used to determine where and when to randomize data in performing the vulnerability analysis. For example, the vulnerability can perform fuzzing based on data in the I/O file 122. If an entry in the I/O file 122 indicates that instruction counter 975 is an input, the memory location corresponding to the input can be populated with random data prior to execution of that instruction. Fuzzing is a technique of inserting random data into operation of an application, such as to identify a bug or other vulnerability.

Additionally, or alternatively, the I/O file 122 can be used by the vulnerability analyzer 110 in performing a taint analysis. Taint analysis can be performed either statically or dynamically. A taint analysis aims to determine what inputs can be modified by a user and how data input to the application is propagated throughout the application. By using the I/O points from the I/O file 122, a dynamic taint analysis can be performed on the execution trace level or a static data flow analysis can be performed by using the I/O point locations to identify locations in the compiled application where input data enters the application. A static analysis can provide better code coverage, such as by exhausting all possible branches of execution. A dynamic analysis can miss a branch or possible operation.

For the pointer data type I/O points in the I/O file 122, a detection of a specific memory vulnerability, like use-after-free or double free, can be performed. These pointer I/O points can be used to gain knowledge of which pointers are currently valid and which ones may no longer be valid at any point in the execution trace. A use-after-free is an attempt to access a memory address after is has been "freed". A use-after-free vulnerability can result in execution of arbitrary code or enable full remote code execution. Memory can be allocated, by the operating system 112, to be dedicated to the application 114. That memory, when deallocated, is called "freed memory". The freed memory can then be used for another application. A double-free memory is a memory that has been deleted twice. The risks for a double-freed memory are similar to those of the use-after-free memory condition. These vulnerabilities can be identified by analysis of whether the use-after-free or double-free conditions are satisfied. These vulnerabilities can include any condition that causes the application 114 to error out, such as based on the dynamic or static taint analysis or the fuzzing analysis.

The vulnerability analyzer 110 can identify a vulnerability 124 of the application 114 based on the I/O file 122. The vulnerability 124 can include any of those previously discussed or other vulnerability.

Figure 2:
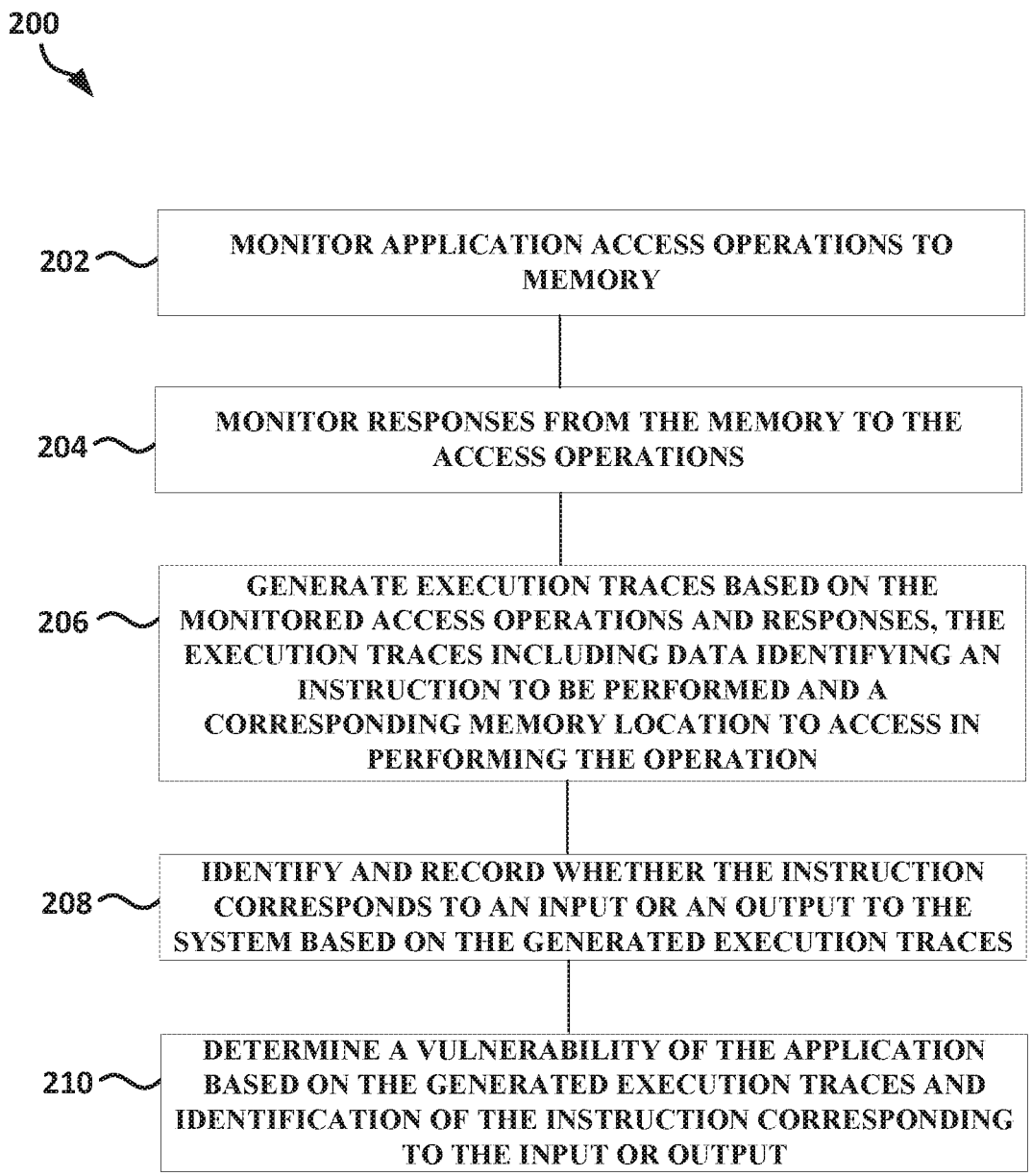
FIG. 2 illustrates, by way of example, an embodiment of a method 200 for (I/O) identification and vulnerability analysis.

FIG. 2 illustrates, by way of example, a diagram of an embodiment of a technique 200 for identifying a vulnerability of an application. The method 200 as illustrated includes monitoring application access operations to a memory, at operation 202; monitoring responses from the memory to the access operations, at operation 204; generating execution traces based on the monitored access operations and responses, the execution traces including data identifying an instruction to be performed and a corresponding memory location to access in performing the access operation, at operation 206; identifying and recording whether the instruction corresponds to an input or an output to the system based on the generated execution traces, at operation 208; and determining vulnerabilities of the application based on the generated execution traces and identification of the instruction corresponding to the input or output, at operation 210.

The operation 202 or 204 can include recording first data including a memory address of an instruction and two or more of a program counter, an instruction pointer, a thread identification, an instruction size, and a number of operands in an instruction to be executed. The operation 202 or 204 can include recording second data two or more of the program counter, the instruction pointer, the memory address, a length of data to be read or written, and a value of the data at the memory address. The operation 206 can include storing, in a first document and for each instruction executed by the application, the first data.

The method 200 can further include generating a memory file including storing, in a second document and for each instruction executed by the application, the second data. The method 200 can further include identifying whether the input or output is a memory pointer. Identifying whether the input or output is a memory pointer can include comparing a value of the access operation or response to a page size of a data memory to be accessed based on the memory pointer and a size of the value to an entry size of the data memory. Identifying whether the input or output is a memory pointer can include determining that the input or output is a memory pointer if (1) the value of the access operation or response is a multiple of the page size and the size of the value is a multiple of the entry size.

Identifying and recording whether the instruction corresponds to an input or an output can include identifying a value of an entry in the data memory to be accessed by the application has changed by an external actor, not the application. Identifying and recording whether the instruction corresponds to the input or output can include recording the instruction associated with the data memory access as an input or output point. Identifying and recording whether the instruction corresponds to an input or an output can include identifying a value of an entry in the data memory written by the application has changed. Identifying and recording whether the instruction corresponds to an input or an output can include recording the instruction associated with the data memory access as an input or output point.

Figure 3:
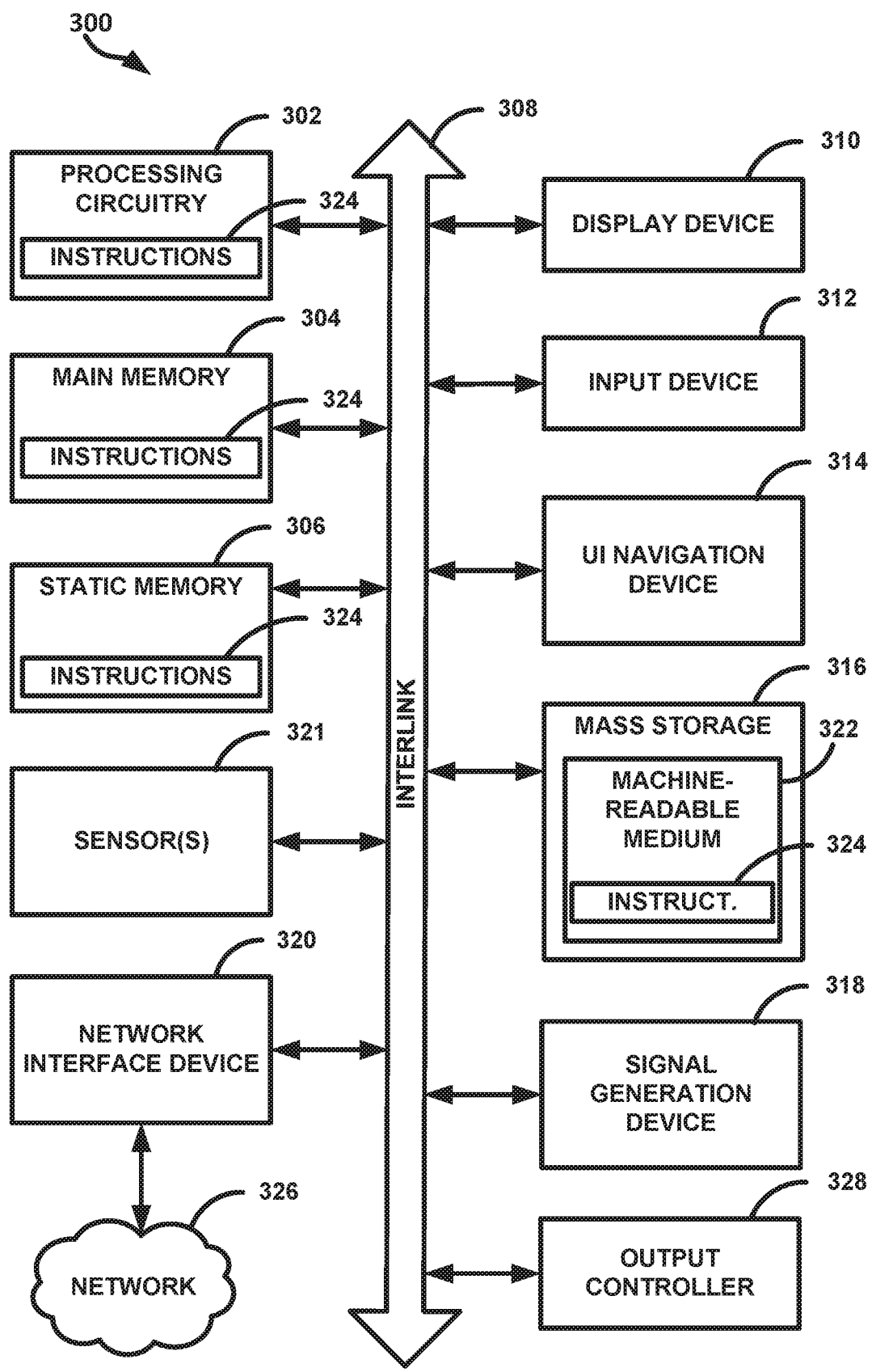
FIG. 3 illustrates, by way of example, a block diagram of an embodiment of a machine on which one or more of the methods, such as those discussed about FIG. 2 and elsewhere herein can be implemented.

FIG. 3 illustrates, by way of example, a block diagram of an embodiment of a machine 300 on which one or more of the methods, such as those discussed about FIG. 2 and elsewhere herein can be implemented. In one or more embodiments, one or more items of the data memory 102, hardware 104, program memory 106, I/O point analyzer 108, or vulnerability analyzer 110, can be implemented by the machine 300. In alternative embodiments, the machine 300 operates as a standalone device or may be connected (e.g., networked) to other machines. In one or more embodiments, the data memory 102, hardware 104, program memory 106, I/O point analyzer 108, or vulnerability analyzer 110 can include one or more of the items of the machine 300. In a networked deployment, the machine 300 may operate in the capacity of a server or a client machine in server-client network environment, or as a peer machine in a peer-to-peer (or distributed) network environment. The machine 300 may be a personal computer (PC), a tablet PC, a set-top box (STB), a Personal Digital Assistant (PDA), a cellular telephone, a web appliance, a network router, switch or bridge, embedded computer or hardware, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 300 includes processing circuitry 302 (e.g., a hardware processor, such as can include a central processing unit (CPU), a graphics processing unit (GPU), an application specific integrated circuit, circuitry, such as one or more transistors, resistors, capacitors, inductors, diodes, logic gates, multiplexers, oscillators, buffers, modulators, regulators, amplifiers, demodulators, or radios (e.g., transmit circuitry or receive circuitry or transceiver circuitry, such as radio frequency (RF) or other electromagnetic, optical, audio, non-audible acoustic, or the like), sensors 321 (e.g., a transducer that converts one form of energy (e.g., light, heat, electrical, mechanical, or other energy) to another form of energy), or the like, or a combination thereof), a main memory 304 and a static memory 306, which communicate with each other and all other elements of machine 300 via a bus 308. The transmit circuitry or receive circuitry can include one or more antennas, oscillators, modulators, regulators, amplifiers, demodulators, optical receivers or transmitters, acoustic receivers (e.g., microphones) or transmitters (e.g., speakers) or the like. The RF transmit circuitry can be configured to produce energy at a specified primary frequency to include a specified harmonic frequency.

The machine 300 (e.g., computer system) may further include a video display unit 310 (e.g., a liquid crystal display (LCD) or a cathode ray tube (CRT)). The machine 300 also includes an alphanumeric input device 312 (e.g., a keyboard), a user interface (UI) navigation device 314 (e.g., a mouse), a disk drive or mass storage unit 316, a signal generation device 318 (e.g., a speaker) and a network interface device 320.

The mass storage unit 316 includes a machine-readable medium 322 on which is stored one or more sets of instructions and data structures (e.g., software) 324 embodying or utilized by any one or more of the methodologies or functions described herein. The instructions 324 may also reside, completely or at least partially, within the main memory 304 and/or within the processing circuitry 302 during execution thereof by the machine 300, the main memory 304 and the processing circuitry 302 also constituting machine-readable media. One or more of the main memory 304, the mass storage unit 316, or other memory device can store the job data, transmitter characteristics, or other data for executing the method of FIG. 2.

The machine 300 as illustrated includes an output controller 328. The output controller 328 manages data flow to/from the machine 300. The output controller 328 is sometimes called a device controller, with software that directly interacts with the output controller 328 being called a device driver.

While the machine-readable medium 322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that can store, encode or carry instructions for execution by the machine and that cause the machine to perform any one or more of the methodologies of the present invention, or that can store, encode or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 324 may further be transmitted or received over a communications network 326 using a transmission medium. The instructions 324 may be transmitted using the network interface device 320 and any one of several well-known transfer protocols (e.g., hypertext transfer protocol (HTTP), user datagram protocol (UDP), transmission control protocol (TCP)/internet protocol (IP)). The network 326 can include a point-to-point link using a serial protocol, or other well-known transfer protocol. Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that can store, encode or carry instructions for execution by the machine, and includes digital or analog communications signals or other intangible media to facilitate communication of such software.

EXAMPLES AND ADDITIONAL NOTES

Example 1 can include a non-transitory machine-readable medium including instructions that, when executed by a machine, cause the machine to perform operations comprising monitoring application access operations to memory, monitoring responses from the memory to the access operations, generating execution traces based on the monitored access operations and responses, the execution traces including data identifying an instruction to be performed and a corresponding memory location to access in performing the operation, identifying and recording whether the instruction corresponds to an input or an output to the system based on the generated execution traces, and determining vulnerabilities of the application based on the generated execution traces and identification of the instruction corresponding to the input or output.

In Example 2, Example 1 can further include, wherein monitoring the application access operations or the monitoring the responses from the memory to the access operations includes recording first data including a memory address of an instruction and two or more of a program counter, an instruction pointer, a thread identification, an instruction size, and a number of operands in an instruction to be executed.

In Example 3, at least one of Examples 1-2 can further include, wherein monitoring the application access operations or the monitoring the responses from the memory to the access operations includes recording second data two or more of the program counter, the instruction pointer, the memory address, a length of data to be read or written, and a value of the data at the memory address.

In Example 4, at least one of Examples 1-3 can further include, wherein generating execution traces includes storing, in a first document and for each instruction executed by the application, the first data.

In Example 5, at least one of Examples 1-4 can further include, generating a memory file including storing, in a second document and for each instruction executed by the application, the second data.

In Example 6, at least one of Examples 1-5 can further include identifying whether the input or output is a memory pointer.

In Example 7, at least one of Examples 1-6 can further include, wherein identifying whether the input or output is a memory pointer includes comparing a value of the access operation or response to a page size of a data memory to be accessed based on the memory pointer and a size of the value to an entry size of the data memory, and determining that the input or output is a memory pointer if (1) the value of the access operation or response is a multiple of the page size and the size of the value is a multiple of the entry size.

In Example 8, at least one of Examples 1-7 can further include, wherein identifying and recording whether the instruction corresponds to an input or an output includes identifying a value of an entry in the data memory to be accessed by the application has changed by an external actor, not the application, and recording the instruction associated with the data memory access as an input or output point.

In Example 9, at least one of Examples 1-8 can further include, wherein identifying and recording whether the instruction corresponds to an input or an output includes identifying a value of an entry in the data memory written by the application has changed, and recording the instruction associated with the data memory access as an input or output point.

Example 10 includes a method for vulnerability analysis based on input or output points inferred from execution traces, the method comprising monitoring application access operations to memory; monitoring responses from the memory to the access operations, generating execution traces based on the monitored access operations and responses, the execution traces including data identifying an instruction to be performed and a corresponding memory location to access in performing the operation, identifying and recording whether the instruction corresponds to an input or an output to the system based on the generated execution traces, and determining vulnerabilities of the application based on the generated execution traces and identification of the instruction corresponding to the input or output.

In Example 11, Example 10 can further include, wherein monitoring the application access operations or the monitoring the responses from the memory to the access operations includes recording first data including a memory address of an instruction and two or more of a program counter, an instruction pointer, a thread identification, an instruction size, and a number of operands in an instruction to be executed.

In Example 12, at least one of Examples 10-11 can further include, wherein monitoring the application access operations or the monitoring the responses from the memory to the access operations includes recording second data two or more of the program counter, the instruction pointer, the memory address, a length of data to be read or written, and a value of the data at the memory address.

In Example 13, at least one of Examples 10-12 can further include, wherein generating execution traces includes storing, in a first document and for each instruction executed by the application, the first data.

In Example 14, at least one of Examples 10-13 can further include generating a memory file including storing, in a second document and for each instruction executed by the application, the second data.

In Example 15, at least one of Examples 10-14 can further include identifying whether the input or output is a memory pointer.

In Example 16, at least one of Examples 10-15 can further include, wherein identifying whether the input or output is a memory pointer includes comparing a value of the access operation or response to a page size of a data memory to be accessed based on the memory pointer and a size of the value to an entry size of the data memory, and determining that the input or output is a memory pointer if (1) the value of the access operation or response is a multiple of the page size and the size of the value is a multiple of the entry size.

In Example 17, at least one of Examples 10-16 can further include, wherein identifying and recording whether the instruction corresponds to an input or an output includes identifying a value of an entry in the data memory to be accessed by the application has changed by an external actor, not the application, and recording the instruction associated with the data memory access as an input or output point.

In Example 18, at least one of Examples 10-17 can further include, wherein identifying and recording whether the instruction corresponds to an input or an output includes identifying a value of an entry in the data memory written by the application has changed, and recording the instruction associated with the data memory access as an input or output point.

Example 19 includes a system for vulnerability analysis based on input or output points inferred from execution traces, the system comprising processing circuitry, a memory including program instructions that, when executed the processing circuitry, configure the processing circuitry to monitor application access operations to memory, monitor responses from the memory to the access operations, generate execution traces based on the monitored access operations and responses, the execution traces including data identifying an instruction to be performed and a corresponding memory location to access in performing the operation, identify and record whether the instruction corresponds to an input or an output to the system based on the generated execution traces, and determine vulnerabilities of the application based on the generated execution traces and identification of the instruction corresponding to the input or output.

In Example 20, Example 19 can further include, wherein the processing circuitry configured to monitor the application access operations or monitor the responses from the memory to the access operations include the processing circuitry configured to record first data including a memory address of an instruction and two or more of a program counter, an instruction pointer, a thread identification, an instruction size, and a number of operands in an instruction to be executed.

In Example 21, at least one of Examples 19-20 can further include, wherein the processing circuitry configured to monitor the application access operations or monitor the responses from the memory to the access operations include the processing circuitry configured to record second data two or more of the program counter, the instruction pointer, the memory address, a length of data to be read or written, and a value of the data at the memory address.

In Example 22, at least one of Examples 19-21, wherein generating execution traces includes storing, in a first document and for each instruction executed by the application, the first data.

In Example 23, at least one of Examples 19-22 wherein the processing circuitry is further configured to generate a memory file including storing, in a second document and for each instruction executed by the application, the second data.

In Example 24, at least one of Examples 19-23 can further include, wherein the processing circuitry is further configured to identify whether the input or output is a memory pointer.

In Example 25, at least one of Examples 19-24 can further include, wherein identifying whether the input or output is a memory pointer includes comparing a value of the access operation or response to a page size of a data memory to be accessed based on the memory pointer and a size of the value to an entry size of the data memory, and determining that the input or output is a memory pointer if (1) the value of the access operation or response is a multiple of the page size and the size of the value is a multiple of the entry size.

In Example 26, at least one of Examples 19-25 can further include, wherein identifying and recording whether the instruction corresponds to an input or an output includes identifying a value of an entry in the data memory to be accessed by the application has changed by an external actor, not the application, and recording the instruction associated with the data memory access as an input or output point.

In Example 27, at least one of Examples 19-26 can further include, wherein identifying and recording whether the instruction corresponds to an input or an output includes identifying a value of an entry in the data memory written by the application has changed, and recording the instruction associated with the data memory access as an input or output point.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A non-transitory machine-readable medium including instructions that, when executed by a machine, cause the machine to perform operations comprising:
monitoring application access operations to a memory;
monitoring responses from the memory to the access operations;
generating and recording execution traces based on the monitored access operations and responses, the execution traces including data identifying an instruction to be performed and a corresponding memory location to access in performing the operation;
identifying and recording, with a corresponding execution trace, whether the instruction corresponds to an input or an output to the application based on the generated execution traces including recording an instruction corresponds to an output in response to determining a memory address of the instruction is written to multiple times by the application and recording an instruction corresponds to an input in response to determining a memory address of the instruction is written to by an entity other than the application and is subsequently accessed by the application; and
determining vulnerabilities of the application based on the recorded execution traces.

2. The non-transitory machine-readable medium of claim 1, wherein:
monitoring the application access operations or the monitoring the responses includes recording first data including a memory address of an instruction and a program counter, an instruction pointer, an instruction size, and a number of operands in an instruction to be executed.

3. The non-transitory machine-readable medium of claim 2, wherein:
monitoring the application access operations or the monitoring the responses includes recording second data including a length of data to be read or written, and a value of the data at the memory address.

4. The non-transitory machine-readable medium of claim 3, wherein:
generating execution traces includes storing, in a first document and for each instruction executed by the application, the first data.

5. The non-transitory machine-readable medium of claim 4, further comprising generating a memory file including storing, in a second document and for each instruction executed by the application, the second data.

6. The non-transitory machine-readable medium of claim 5, further comprising identifying whether the input or output is a memory pointer.

7. The non-transitory machine-readable medium of claim 6, wherein identifying whether the input or output is a memory pointer includes:
comparing a value of the access operation or response to a page size of a data memory to be accessed based on the memory pointer and a size of the value to an entry size of the data memory; and
determining that the input or output is a memory pointer if (1) the value of the access operation or response is a multiple of the page size and the size of the value is a multiple of the entry size.

8. A method for vulnerability analysis based on input or output points inferred from execution traces, the method comprising:
monitoring application access operations to a memory;
monitoring responses from the memory to the access operations;
generating and recording execution traces based on the monitored access operations and responses, the execution traces including data identifying an instruction to be performed and a corresponding memory location to access in performing the operation;
identifying and recording, with a corresponding execution trace, whether the instruction corresponds to an input or an output to the application based on the generated execution traces including recording an instruction corresponds to an output in response to determining a memory address of the instruction is written to multiple times by the application and recording an instruction corresponds to an input in response to determining a memory address of the instruction is written to by an entity other than the application and is subsequently accessed by the application; and
determining vulnerabilities of the application based on the recorded execution traces.

9. The method of claim 8, wherein:
monitoring the application access operations or the monitoring the responses includes recording first data including a memory address of an instruction and a program counter, an instruction pointer, an instruction size, and a number of operands in an instruction to be executed.

10. The method of claim 9, wherein:
monitoring the application access operations or the monitoring the responses includes recording second data including a length of data to be read or written, and a value of the data at the memory address.

11. The method of claim 10, wherein:
generating execution traces includes storing, in a first document and for each instruction executed by the application, the first data.

12. The method of claim 11, further comprising generating a memory file including storing, in a second document and for each instruction executed by the application, the second data.

13. A system comprising:
processing circuitry;
a memory including program instructions that, when executed the processing circuitry, configure the processing circuitry to:
monitor application access operations to a memory;
monitor responses from the memory to the access operations;
generate execution traces based on the monitored access operations and responses, the execution traces including data identifying an instruction to be performed and a corresponding memory location to access in performing the operation;
identify and record whether the instruction corresponds to an input or an output to the application based on the generated execution traces including recording an instruction corresponds to an output in response to determining a memory address of the instruction is written to multiple times by the application and recording an instruction corresponds to an input in response to determining a memory address of the instruction is written to by an entity other than the application and is subsequently accessed by the application; and determine vulnerabilities of the application based on the generated execution traces and identification of the instruction corresponding to the input or output.

14. The system of claim 13, wherein the processing circuitry is further configured to identify whether the input or output is a memory pointer.

15. The system of claim 14, wherein identification of whether the input or output is a memory pointer includes:
compare a value of the access operation or response to a page size of a data memory to be accessed based on the memory pointer and a size of the value to an entry size of the data memory; and
determine that the input or output is a memory pointer if (1) the value of the access operation or response is a multiple of the page size and the size of the value is a multiple of the entry size.

16. The system of claim 15, wherein:
generation of the execution traces includes storing, in a first document and for each instruction executed by the application, the first data; and
the processing circuitry is further configured to generate a memory file including storing, in a second document and for each instruction executed by the application, the second data.

* * * * *